United States Patent
Beaucoup

(10) Patent No.: US 9,609,141 B2
(45) Date of Patent: Mar. 28, 2017

(54) LOUDSPEAKER LOCALIZATION WITH A MICROPHONE ARRAY

(71) Applicant: Avago Technologies General IP (Singapore) Pte. Ltd., Singapore (SG)

(72) Inventor: Franck Beaucoup, Vancouver (CA)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 696 days.

(21) Appl. No.: 13/680,787

(22) Filed: Nov. 19, 2012

(65) Prior Publication Data
US 2014/0119552 A1 May 1, 2014

Related U.S. Application Data

(60) Provisional application No. 61/718,839, filed on Oct. 26, 2012.

(51) Int. Cl.
H04B 3/20 (2006.01)
H04M 9/08 (2006.01)

(52) U.S. Cl.
CPC .................... H04M 9/082 (2013.01)

(58) Field of Classification Search
CPC ... H04M 9/082; H04R 3/005; G10K 11/1786; G10K 2210/30232
USPC .. 381/17, 92, 66, 71.1, 71.11, 71.4, 93, 94.1
See application file for complete search history.

(56) References Cited

U.S. PATENT DOCUMENTS

| | | | |
|---|---|---|---|
| 2003/0208392 A1* | 11/2003 | Shekar | G06Q 10/06 705/7.22 |
| 2006/0100779 A1* | 5/2006 | Vergin | G01C 21/34 701/431 |
| 2006/0210091 A1* | 9/2006 | Okumura | H04R 3/02 381/71.11 |
| 2007/0263850 A1* | 11/2007 | Stokes | H04M 9/082 379/406.01 |
| 2009/0089054 A1* | 4/2009 | Wang | H04M 9/082 704/233 |
| 2010/0195444 A1* | 8/2010 | Choisel | H04R 5/02 367/127 |
| 2011/0091055 A1 | 4/2011 | LeBlanc | |

FOREIGN PATENT DOCUMENTS

DE            EP2375779        * 10/2011

* cited by examiner

*Primary Examiner* — Vivian Chin
*Assistant Examiner* — William A Jerez Lora
(74) *Attorney, Agent, or Firm* — Sterne, Kessler, Goldstein & Fox P.L.L.C.

(57) ABSTRACT

Embodiments of the present disclosure provide systems and methods for source localization using a microphone array. Such an embodiment, among others, utilizes circuitry to process audio signals and microphone signals to remove an echo (produced by a nearby loudspeaker) from the microphone signals using a plurality of adaptive echo cancellation filters. Location information is then determined for the loudspeaker based on the plurality of adaptive echo cancellation filters used to remove the echo.

20 Claims, 12 Drawing Sheets

LOUDSPEAKER LOCALIZATION WITH A MICROPHONE ARRAY

CROSS-REFERENCE TO RELATED APPLICATION

This application claims the benefit of a copending U.S. provisional application entitled, "Loudspeaker Localization with a Microphone Array," having Ser. No. 61/718,839, filed Oct. 26, 2012, which is entirely incorporated herein by reference.

BACKGROUND

A variety of sound systems exist for providing audio to listeners. For example, many people own home audio systems that include receivers and amplifiers used to play recorded music. In another example, many people are installing home theater systems in their homes that seek to reproduce movie theater quality video and audio. Such systems include televisions (e.g., standard CRT televisions, flat screen televisions, projector televisions, etc.) to provide video in conjunction with the audio. In still another example, conferencing systems exist that enable the live exchange of audio and video information between persons that are remotely located, but are linked by a telecommunications system. In a conferencing system, persons at each location may talk and be heard by persons at the locations. When the conferencing system is video enabled, video of persons at the different locations may be provided to each location, to enable persons that are speaking to be seen and heard.

A sound system may include numerous loudspeakers to provide quality audio. In a relatively simple sound system, two loudspeakers may be present. One of the loudspeakers may be designated as a right loudspeaker to provide right channel audio, and the other loudspeaker may be designated as a left loudspeaker to provide left channel audio. The supply of left and right channel audio may be used to create the impression of sound heard from various directions, as in natural hearing. Sound systems of increasing complexity exist, including stereo systems that include large numbers of loudspeakers. For example, a conference room used for conference calling may include a large number of loudspeakers arranged around the conference room, such as wall mounted and/or ceiling mounted loudspeakers. Furthermore, home theater systems may have multiple loudspeaker arrangements configured for "surround sound." For instance, a home theater system may include a surround sound system that has audio channels for left and right front loudspeakers, an audio channel for a center loudspeaker, audio channels for left and right rear surround loudspeakers, an audio channel for a low frequency loudspeaker (a "subwoofer"), and potentially further audio channels. Many types of home theater systems exist, including 5.1 channel surround sound systems, 6.1 channel surround sound systems, 7.1 channel surround sound systems, etc.

For sound systems, in general, it is important that each loudspeaker be positioned correctly, so that quality audio is reproduced. Mistakes often occur during installation of loudspeakers for a sound system, including positioning loudspeakers to far or too near to a listening position, reversing left and right channel loudspeakers, etc.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Embodiments of the present disclosure provide systems and methods for acoustic source localization using a microphone array. Such an embodiment, among others, utilizes circuitry to process audio signals and microphone signals to remove an echo (produced by a nearby loudspeaker) from the microphone signals using a plurality of adaptive echo cancellation filters. Location information is then determined for the loudspeaker based on the plurality of adaptive echo cancellation filters used to remove the echo.

Figure 1:
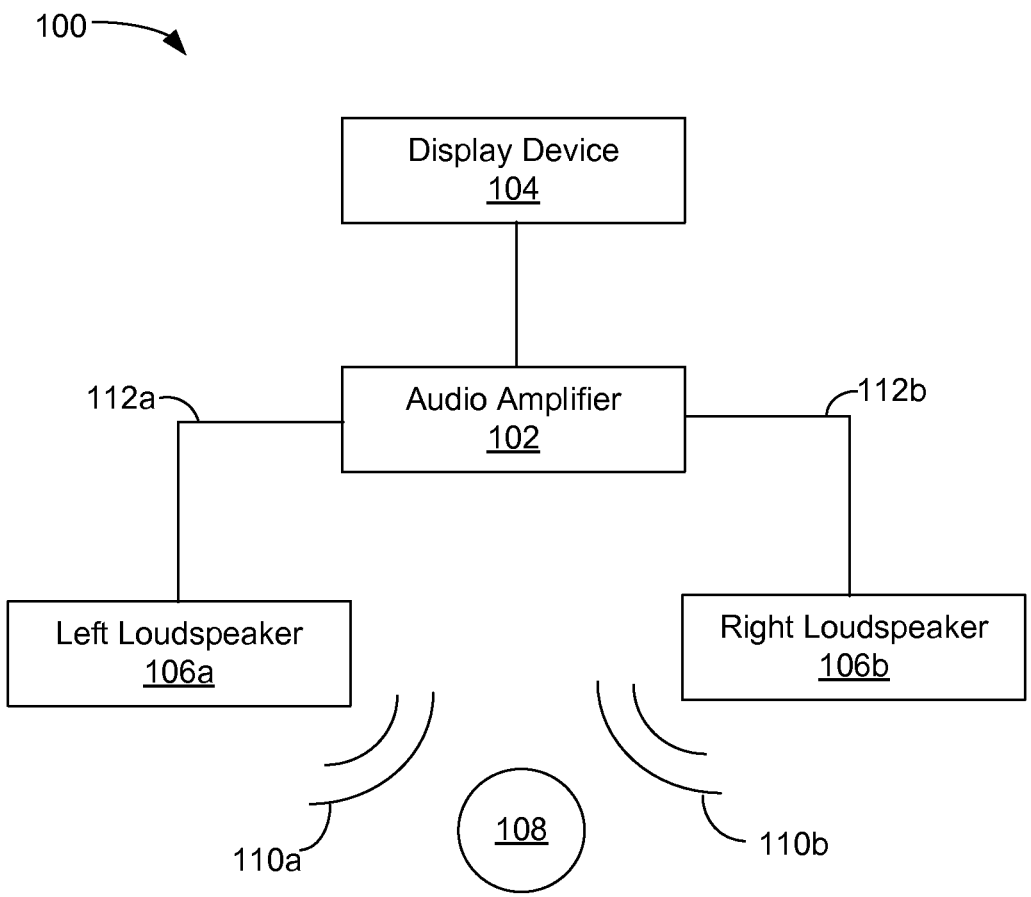
FIG. 1 is a block diagram of an exemplary sound system in accordance with embodiments of the present disclosure.

In embodiments, techniques of acoustic source localization are used to determine the locations of loudspeakers, to enable the position of a loudspeaker to be corrected if not positioned properly or to enable inversion of the audio feeds to the respective loudspeakers. For example, FIG. 1 shows a block diagram of a sound system 100. As shown in FIG. 1, sound system 100 includes an audio amplifier 102, a display device 104, a left loudspeaker 106a, and a right loudspeaker 106b. Sound system 100 is configured to generate audio for an audience, such as a user 108 that is located in a listening position. Sound system 100 may be configured in various environments. For example, sound system 100 may be a home audio system in a home of user 108, and user 108 (and optionally further users) may sit in a chair or sofa, or may reside in other listening position for sound system 100. In another example, sound system 100 may be a sound system for a conferencing system in a conference room, and user 108 (and optionally other users) may be a conference attendee that sits at a conference table or resides in other listening position in the conference room.

Audio amplifier 102 receives audio signals from a local device or a remote location, such as a radio, a CD (compact disc) player, a DVD (digital video disc) player, a video game console, a website, a remote conference room, etc. Audio amplifier 102 may be incorporated in a device, such as a conventional audio amplifier, a home theater receiver, a video game console, a conference phone (e.g., an IP (Internet) protocol phone), or other device, or may be separate. Audio amplifier 102 may be configured to filter, amplify, and/or otherwise process the audio signals to be played from left and right loudspeakers 106a and 106b. Any number of loudspeakers 106 may optionally be present in addition to loudspeakers 106a and 106b.

Display device 104 is optionally present when video is provided with the audio played from loudspeakers 106a and 106b. Examples of display device 104 include a standard CRT (cathode ray tube) television, a flat screen television (e.g., plasma, LCD (liquid crystal display), or other type), a projector television, etc.

As shown in FIG. 1, audio amplifier 102 generates a first loudspeaker signal 112a and a second loudspeaker signal 112b. First loudspeaker signal 112a contains first channel audio used to drive first loudspeaker 106a, and second loudspeaker signal 112b contains second channel audio used to drive second loudspeaker 106b. First loudspeaker 106a receives first loudspeaker signal 112a, and produces first sound 110a. Second loudspeaker 106b receives second loudspeaker signal 112b, and produces second sound 110b. First sound 110a and second sound 110b are received by user 108 at the listening position to be perceived as together as an overall sound experience (e.g., as stereo sound), which may coincide with video displayed by display device 104.

For a sufficiently quality audio experience, it may be desirable for left and right loudspeakers 106a and 106b to be positioned accurately. For example, it may be desired for left and right loudspeakers 106a and 106b to be positioned on the proper sides of user 108 (e.g., left loudspeaker 106a positioned on the left, and right loudspeaker 106b positioned on the right). Furthermore, it may be desired for left and right loudspeakers 106a and 106b to positioned equally distant from the listening position on opposite sides of user 108, so that sounds 110a and 110b will be received with substantially equal volume and phase, and such that formed sounds are heard from the intended directions. It may be further desired that any other loudspeakers included in sound system 100 also be positioned accurately.

Figure 2:
FIG. 2 is a block diagram of an exemplary audio amplifier in accordance with embodiments of the present disclosure.

In embodiments, the positions of loudspeakers are determined, and are enabled to be corrected if sufficiently incorrect (e.g., if incorrect by greater than a predetermined threshold). For instance, FIG. 2 shows a block diagram of an audio amplifier 202, according to an example embodiment. As shown in FIG. 2, audio amplifier 202 includes a loudspeaker localizer 204. Loudspeaker localizer 204 is configured to determine the position of loudspeakers using one or more techniques of acoustic source localization. The determined positions may be compared to desired loudspeaker positions (e.g., in predetermined loudspeaker layout configurations) to determine whether loudspeakers are incorrectly positioned. Any incorrectly positioned loudspeakers may be repositioned, either manually (e.g., by a user physically moving a loudspeaker, rearranging loudspeaker cables, modifying amplifier settings, etc.) or automatically (e.g., by electronically modifying audio channel characteristics). Additionally or alternatively, the loudspeaker localizer 204 can cause a message to be displayed on display device 104 or an audio alert to be signaled to indicate that the positioning of the loudspeakers needs to be corrected.

Figure 3:
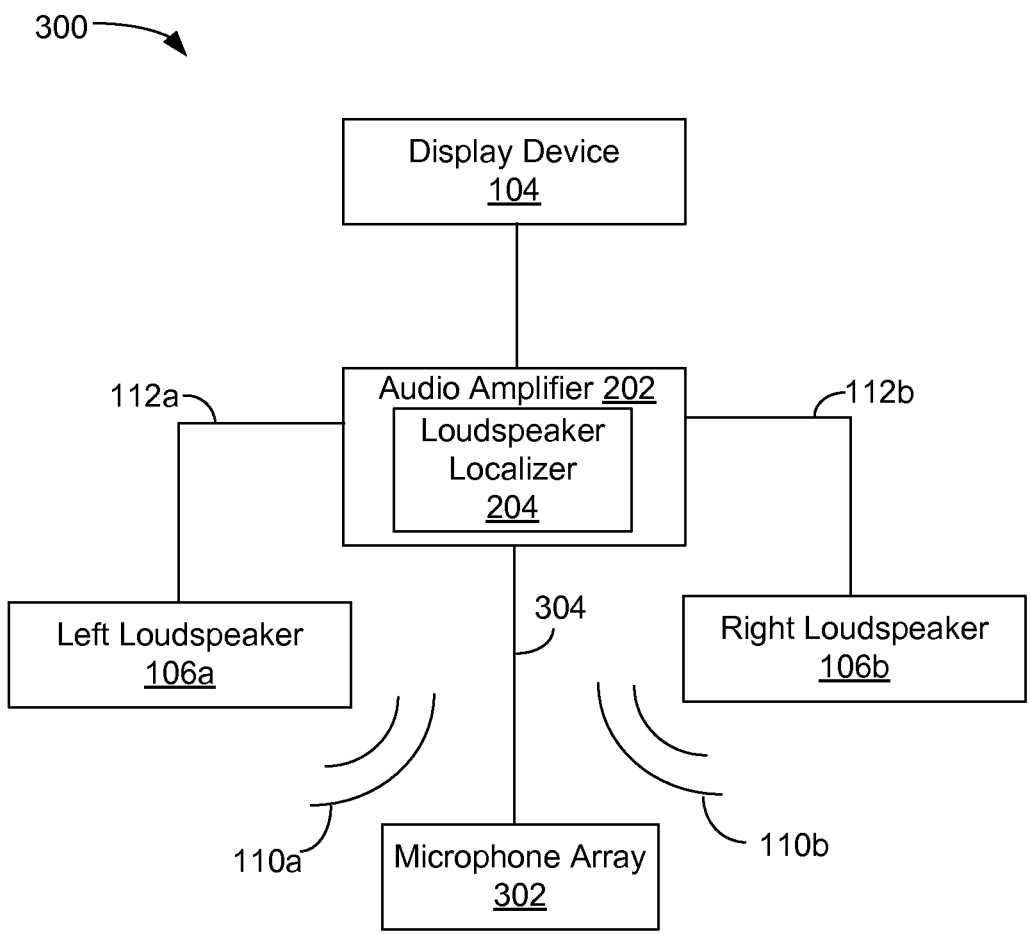
FIG. 3 is a block diagram of an exemplary sound system in accordance with embodiments of the present disclosure.

For instance, FIG. 3 shows a block diagram of a sound system 300, according to an example embodiment. Sound system 300 is similar to sound system 100 shown in FIG. 1, with differences described as follows. As shown in FIG. 3, audio amplifier 202 (shown in FIG. 3 in place of audio amplifier 102 of FIG. 1) includes loudspeaker localizer 204, and is coupled (wirelessly or in a wired fashion) to display device 104, left loudspeaker 106a, and right loudspeaker 106b. Furthermore, a microphone array 302 is included in FIG. 3. Microphone array 302 includes one or more microphones that may be positioned in various microphone locations to receive sounds 110a and 110b from loudspeakers 106a and 106b. Microphone array 302 may be a separate device or may be included within a device or system, such as a home theatre system, a VoIP telephone, a BT (Bluetooth) headset/car kit, as part of a gaming system, etc. Microphone array 302 produces microphone signals 304 that are received by loudspeaker localizer 204. The loudspeaker localizer 204 determines the location of one or both of left and right loudspeakers 106a and 106b. Audio amplifier 202 may be configured to modify first and/or second loudspeaker signals 112a and 112b provided to left and right loudspeakers 106a and 106b, respectively, based on the determined location(s) to virtually reposition one or both of left and right loudspeakers 106a and 106b.

One embodiment of the loudspeaker localizer 204 uses microphone signals 304, which are electrical signals representative of sounds 110a and/or 110b received by the one or more microphones of microphone array 302, to determine the location of one or both of left and right loudspeakers 106a and 106b.

Figure 4:
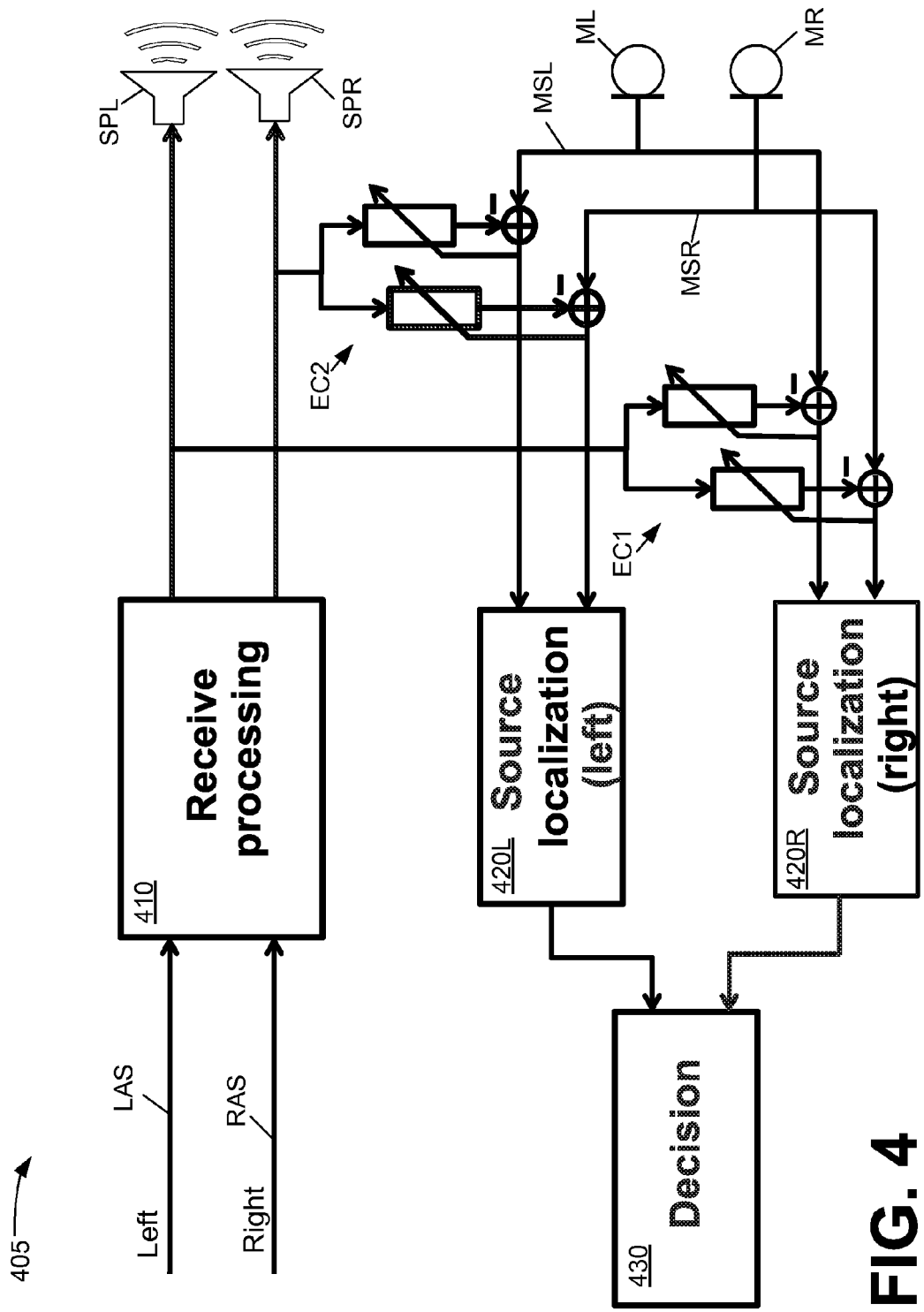
FIGS. 4-5 are block diagrams of exemplary embodiments of a loudspeaker localizer in accordance with embodiments of the present disclosure.

Referring now to FIG. 4, such an exemplary embodiment 405 of the loudspeaker localizer 204 is depicted. As shown in FIG. 4, one exemplary embodiment includes two loudspeakers (SPL, SPR) and a receive processing circuitry or logic 410 ("receive processor"), where a left audio signal (LAS) and a right audio signal (RAS) are shown as being input to the receive processor 410 and then separately output to one of the loudspeakers (SPL, SPR).

In one embodiment, the receive processor 410 applies processing to the audio signals, such as modifying volume levels; applying compression (e.g., if a signal is too large); applying automatic gain control, etc.

An exemplary embodiment of the loudspeaker localizer 405 also includes two microphones (ML, MR) as part of a microphone array to localize the source of sounds emitted by a loudspeaker (SPL, SPR) and echo cancellation circuitry or logic (EC1, EC2) ("echo cancellation module"). From each microphone (ML, MR) which is positioned in a horizontal spatial alignment in one embodiment, the contribution of the echo from the left loudspeaker (SPL) is removed by echo cancellation module (EC1). This produces a signal that is dominated by the signal from the right loudspeaker (SPR) and is input to source localization (right) circuitry or logic 420R ("source localization module"), where the source localization (right) module 420R implements a source localization algorithm to determine the location of the right loudspeaker (SPR). Possible source localization algorithms include Steered Response Power (SRP) algorithms and its variants (e.g., SRP-PHAT), among others.

At the same time, the contribution or echo from the right loudspeaker (SPR) is removed from the two microphone signals by echo cancellation module (EC2). This produces a signal dominated by contribution from the left loudspeaker (SPL) which is fed to the source localization (left) module 420L, where the source localization module 420L implements a source localization algorithm to determine the location of the left loudspeaker (SPL).

In other words, each echo canceller (EC1, EC2) receive audio signals being fed to a loudspeaker (SPL, SPR), processes the signals to produce an estimate of the echo for the audio signals, and then outputs the echo signal to a combiner device which subtracts the echo from sound picked up by microphones (ML, MR). The resulting signals are input to respective source localization module 420L, 420R, which is coupled to decision circuitry or logic 430 ("decision module").

In an exemplary embodiment, echo cancellation module (EC1, EC2) includes a plurality of adaptive echo cancellation filters used to receive microphone signals from a plurality of microphones and audio signals tapped form a loudspeaker input. The echo cancellation module (EC1, EC2) then uses the audio signals being provided to the loudspeaker as a reference to adapt the adaptive echo cancellation filters. Accordingly, for an additional loudspeaker, an additional set of echo cancellation module can be deployed. In some embodiments, the echo cancellation for each audio channel from the loudspeakers is achieved with conventional adaptive transversal filters.

Accordingly, the echo cancellation module (EC1, EC2) obtains the audio signals that are to be played by the loudspeakers (SPL, SPR). Because the echo cancellation modules (EC1, EC2) receive the audio signals before being played out by the loudspeakers (SPL, SPR), the echo cancellers (EC1, EC2) can remove an echo of the signal from a respective microphone signal (MSL, MSR).

For each audio channel and for each microphone (MPL, MPR), the adaptive echo cancellation algorithm of the echo cancellation module (EC1, EC2) automatically adapts an adaptive filter in such a way that the filter removes an echo signal estimate from a microphone signal (MSL, MSR). For example, the echo cancellation module (EC1, EC2) may be configured to examine a difference in a level between an original microphone signal and the resulting signal after echo cancellation. If the signal after echo cancellation is smaller than the original signal, the original signal may be determined by the echo canceller to have been mostly composed of echo signals. As a result, the echo cancellation module (EC1, EC2) may pass the signal to the source localization module 420L, 420R for localization.

On the other hand, if the echo cancellation module (EC1, EC2) determines that the resulting signal after echo cancellation is practically as large as the original microphone signal before echo cancellation, the echo cancellation circuitry or logic (EC1, EC2) may be configured to not pass the signal to the source localization module 420L, 420R for localization. In other words, when the resulting signal is not dominated by received loudspeaker echo signals, the signal may not be processed by the source localization module 420L, 420R.

Accordingly, the source localization module 420L, 420R receives the output from the echo cancellation module (EC1, EC2) and generates estimates of a location of the loudspeakers (SPL, SPR). From the source localization modules 420L, 420R, the determined estimates of the location or positioning of the two loudspeakers (SPL, SPR) are input to a decision module 430. After which, the decision module 430 processes the estimate location signals and determines whether the positioning of the loudspeakers (SPL, SPR) is correct. If the positioning is determined to be incorrect, such as the left loudspeaker (SPL) being positioned on the right and vice versa, one embodiment of the decision module 430 may automatically command that the input audio signals or feeds be switched (swapped) or reversed between the two loudspeakers (SPL, SPR), among other possible options.

The implementation of the loudspeaker localizer 405 of FIG. 4 is one of many possible implementations. Accordingly, for some situations, a different implementation may be preferred. For instance, the arrangement of FIG. 4 has a higher computational cost than other possible arrangements (such as the embodiment of FIG. 5) due to the source localization modules needing to be active while the echo cancellation modules and loudspeakers are also active. Therefore, the source localization is implemented during "receive-only" time intervals, where audio signals are received for output by the loudspeakers (SPL, SPR) and near-end speech/background noise activity is not detected from the microphones (ML, MR). In this interval, the echo cancellation modules (EC1, EC2) are also active to remove the echo contribution of the loudspeakers from the microphone signals and pass the resulting signals to the source localization modules 420L, 420R. Accordingly, the computational load of such a loudspeaker localizer 405 is at its highest while the source localization algorithms are being performed. While signals may be buffered to delay the source localization processing, this represents additional memory costs and additional complexity for the source localization modules 420.

In the above example, it is assumed that the loudspeaker localizer 405 is configured to detect near-end noise that is not output by the loudspeakers (SPL, SPR). Depending on the relative levels of the background noise compared to echo from a loudspeaker, the background noise or doubletalk is not always easy to detect. Conventional echo cancellers utilize doubletalk protection which may be used with the source localization module to forgo processing of signals with doubletalk. However, the doubletalk protection available in conventional echo cancellers is generally not very robust, because a fast response time is used, and it is limited to processing echo signals having a volume level above the local noise level. Therefore, the source localization module may be provided signals having too much double-talk or insufficient signal-to-noise ratio (SNR) which will result in poor performance.

Figure 5:
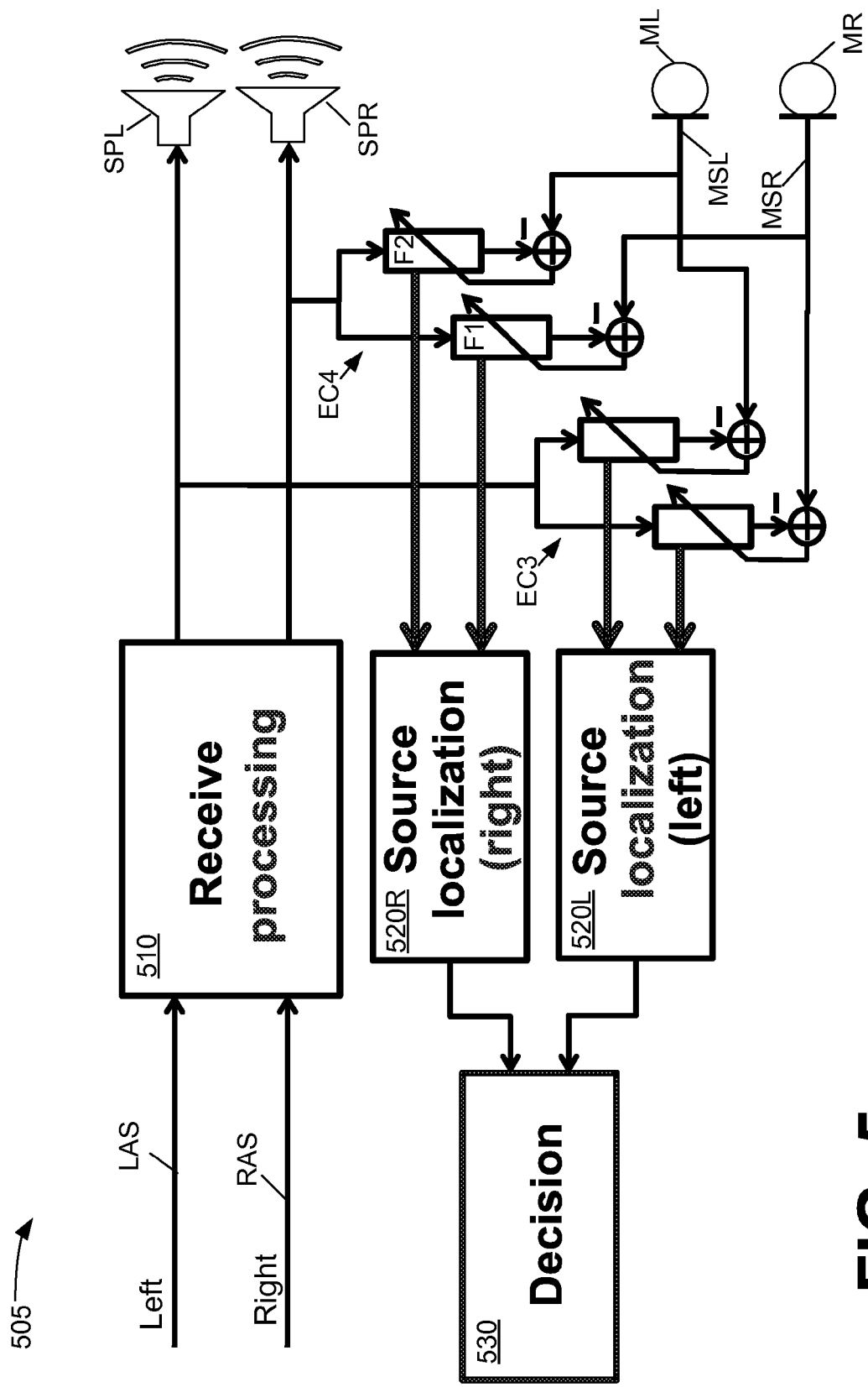

Referring now to FIG. 5, an exemplary alternative embodiment of the loudspeaker localizer 204 is depicted that addresses some of the preceding issues. Similar to FIG. 4, there are two microphones (ML, MR) and two loudspeakers (SPL, SPR). A left audio signal (LAS) and a right audio signal (RAS) are shown as being input to receive processing circuitry or logic 510 ("receive processor"). The receive processor 510 can process the audio signals, such as by changing volume levels; applying compression; applying automatic gain control, etc. Accordingly, the receive processor 510 can process input signals and output a left and right audio signal destined for the two loudspeakers (SPL, SPR).

To localize the source of sounds emitted by one of the loudspeakers (SPL, SPR), microphone signals (MSL, MSR) from the two microphones (ML, MR) are utilized, where the microphones are part of a microphone array 302. From each microphone, the contribution of the echo from the left loudspeaker (SPL) is removed by echo cancellation circuitry or logic (EC3) ("echo cancellation module"). This produces a signal that is dominated by the signal from the right loudspeaker (SPR).

However, unlike the embodiment of FIG. 4, instead of feeding the resulting signal from the echo cancellation module (EC3) to source localization (right) circuitry or logic 520R ("source localization module"), the transfer function (e.g., filter coefficients) for the echo cancellation module (EC3) is provided to the source localization (left) module 520L. Then, the source localization module 520L implements a source localization algorithm to determine the location of the left loudspeaker (SPL) using spatial information obtained from the echo cancellation filter coefficients.

At the same time, the contribution or echo from the right loudspeaker (SPR) is removed from the two microphone signals (MSL, MSR) by echo cancellation module (EC4). This produces a signal dominated by contribution from the left loudspeaker (SPL). The transfer function (e.g., filter coefficients) for the echo cancellation module (EC4) is provided to the source localization (right) module 520R, where the source localization module 520R implements a source localization algorithm to determine the location of the right loudspeaker (SPR).

With this approach, it is noted that the spatial information (e.g., magnitude and phase differences at the microphones ML, MR) in the contribution of the receive channel to the echo signals at the microphones is captured in the echo paths of the echo cancellation module (e.g., transfer function between the loudspeaker and the microphone, for each microphone). In other words, the difference in the received signals after echo-cancellation is related to the spatial position of the source (e.g., loudspeaker) and is represented by magnitude and phase differences of the microphone signals at the microphones. Therefore, this spatial information is included in two microphone signals (MSL, MSR); is carried through the echo cancellation processing; and is captured in the adaptive filters of the echo cancellation modules (EC3, EC4). Accordingly, for each microphone k, the microphone signal can be modeled as:

$$s_k(n) = \sum_{i=0}^{M} [(r_i * h_{i,k})(n)] + x_k(n),$$

where $h_{i,k}=[h_{i,k}(0), h_{i,k}(1), \ldots, h_{i,k}(N)]$ is the transfer function between loudspeaker i and microphone k. Therefore, instead of feeding the microphone signals (having been echo cancelled for all other channels) to the source localization module 520, adaptive filters from the echo cancellation modules (EC3, EC4) can be tapped to the source localization modules 520. In other words, the left and right instances of the implemented source localization algorithms are not provided residual echoes or error signals but receive actual adaptive filters.

For illustration, in FIG. 5, consider the echo cancellation module EC4 being fed by the right loudspeaker SPR. Let's suppose the right loudspeaker (SPR) is active and the signal from the right microphone (MR) is a few samples late compared to the signal from left microphone (ML). The two echo cancellation filters (F1, F2) of EC4 will adapt the echo path between the loudspeaker (SPR) and the two microphones (ML, MR), and this temporal difference between the microphone signals (MSL, MSR) will end up in the adaptive filters of the echo cancellation module. Therefore, the adaptive filter F1 of the echo cancellation module (EC4) corresponding to right microphone will end up looking like a delayed version of the adaptive filter F2 of the echo cancellation module (EC4) corresponding to the left microphone (ML).

In one embodiment, each adaptive filter (e.g., finite impulse response (FIR) filter) utilized by the pair of echo cancellation module (EC3, EC4) represents a transfer function, where the adaptive filters computes filter coefficients used to filter the input audio signals tapped from the loudspeaker inputs. The echo cancellers (EC3, EC4) produce an estimate of the echo for the audio signals and then outputs the echo signal to a combiner device which subtracts the echo from sound picked up by microphones (ML, MR). The result is used to adapt the respective filter of the echo canceller (EC3, EC4). As discussed above, the inputs to respective source localization modules 520 are the adaptive filters. Further, the source localization modules 520 are coupled to decision circuitry or logic 530 ("decision module"), as described in FIG. 4.

Embodiments of the loudspeaker localizer 204 may use linear or non-linear echo cancellation techniques. As mentioned, a FIR filter may be implemented as a form of linear echo cancellation with doubletalk protection. Also, embodiments may utilize adaptive filters that feature a small adaption step size, such as Least Mean Square, and can achieve convergence beyond a local noise level. Further, non-linear adaptive filters (e.g. quadratic, Volterra, etc.) can be used to model possible non-linearities in the true acoustic echo path (e.g., loudspeaker distortion, clipping, etc.). Such non-linear adaptive filters also carry spatial information. Further, non-linear adaptive filters and linear adaptive filters may be used in conjunction to perform loudspeaker localization, in some embodiments.

As mentioned previously, many conventional echo cancellation filters provide doubletalk protection, such that the filters do not adapt while doubletalk activity is detected. Since some embodiments utilize adaptive filters that adapt slowly over time, echo contributions for the filter can be adapted when the echo signals are at a similar level as the background noise. The exemplary embodiment of the loudspeaker localizer 505 of FIG. 5 is unique in that the source localization module can be provided spatial information during periods of inactivity for the echo cancellation module (EC3, EC4) and/or loudspeakers (SPR, SPL), since the spatial information is captured in the adaptive filters and is not reliant on contemporaneous echo signals. Accordingly, there is no need to output the spatial information during receive activity for the echo cancellation module (which helps reduce computational complexity), since the echo cancellation filters are tapped as inputs to the source localization module 520L, 520R.

Additionally, for some embodiments, the whole adaptive filters (meaning their whole length) do not need to be provided to the source localization circuitry or logic. Consider that an acoustic echo path typically decays very quickly. Therefore, in some embodiments, it is sufficient to pass the very beginning subset of the adaptive filters to the source localization modules 520, which accounts for the direct-path echo (e.g. 5 to 10 ms). As a result, although an echo cancellation filter may have several hundred coefficients, the direct propagation of the sound between a loudspeaker and a microphone may be captured within a beginning subset portion of the filter (e.g., 10-20 coefficients corresponding to a few milliseconds depending on the sampling rate).

Figure 6:
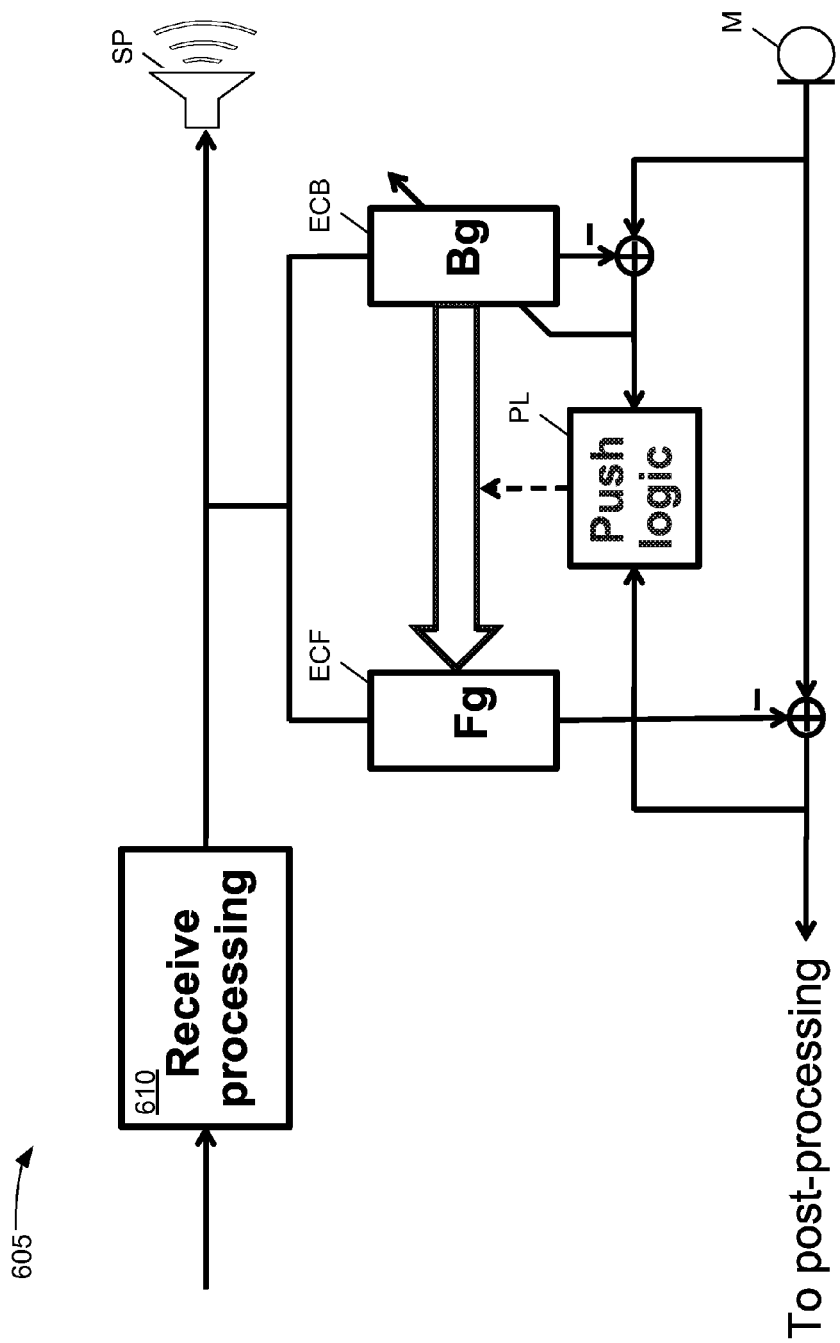
FIG. 6 is a block diagram of exemplary portion of the loudspeaker localizer of FIG. 5 in accordance with the present disclosure.

Referring now to FIG. 6, an embodiment of a portion of the loudspeaker localizer 505 is described. An exemplary two-path structure of a portion of the echo cancellation module 605 is depicted with foreground and background echo-cancellation filters (ECB, ECF) of exemplary echo cancellation circuitry. In this example, the two-path structure includes one loudspeaker (SP) and one microphone (M) for the sake of simplicity, along with push logic (PL). In particular, audio signals are received by receive processing circuitry or logic 610 ("receive processor"), where the signals may undergo signal processing and be output to the loudspeaker (SP). As shown, the output audio signals are tapped by the echo cancellation filters (ECB, ECF).

In the figure, two echo cancellation filters are shown, namely a background filter (ECB) and a foreground filter (ECF). The echo cancellation signal that is sent out for further post-processing is performed using the foreground filter (ECF) which is not continually active and is updated occasionally (e.g. 100 ms) depending upon the push logic (PL). Correspondingly, the source localization algorithm only needs to be executed when such a "push" happens. However, the background filter (ECB) is continually active. During a push, the foreground filter (ECF) is updated and the foreground filter is subsequently provided to the source localization modules 520.

As an example, suppose that the loudspeaker (SP) is active, and an echo is received by the microphone (M). The background filter (ECB) receives the microphone signal from the microphone (M) and adapts constantly at a fast rate, in an exemplary embodiment. Further, the push logic (PL) monitors the performance of the background filter (ECB) and selects to push filter coefficients from the background filter (ECB) to the foreground filter (ECF) for updating when the performance of the background filter (ECB) is improved over the performance of the foreground filter (ECF).

Accordingly, the push logic (PL) compares errors signals from the background filter (ECB) and foreground filter (ECF). Initially, the foreground error signal shall be the same as the microphone signal. Subsequently, the push logic will continue to compare the foreground error with the background error, and if the background error is smaller than the foreground error consistently over time, the push logic (PL) transfers the filter coefficients from the background filter (ECB) to the foreground filter (ECF) for updating.

Therefore, the push logic (PL) protects source localization modules 520 from short time divergence due to doubletalk interference within the microphone signals. When doubletalk is present, the background filter (ECB) may start to diverge and the push logic can then detect the divergence and not push the background filter (ECB). Embodiments of the push logic (PL) may perform push decisions over an interval that is comparable to a 100 ms duration. FIG. 6 also shows post-processing being implemented on processed signals. Post-processing may include echo suppression (to eliminate the residual echo remaining after echo cancellation), noise suppression, etc.

Further, source localization modules 520 do not require continual activity, in some embodiments. For example, the source localization algorithm may be performed in response to a push occurring to the foreground filter (ECF) and new spatial information being available (which helps reduce computational complexity). Again, this is due to the source localization algorithm being fed the foreground filters. Therefore, the source localization algorithm does not need to be executed unless a push happens and new information is available.

Figure 12:
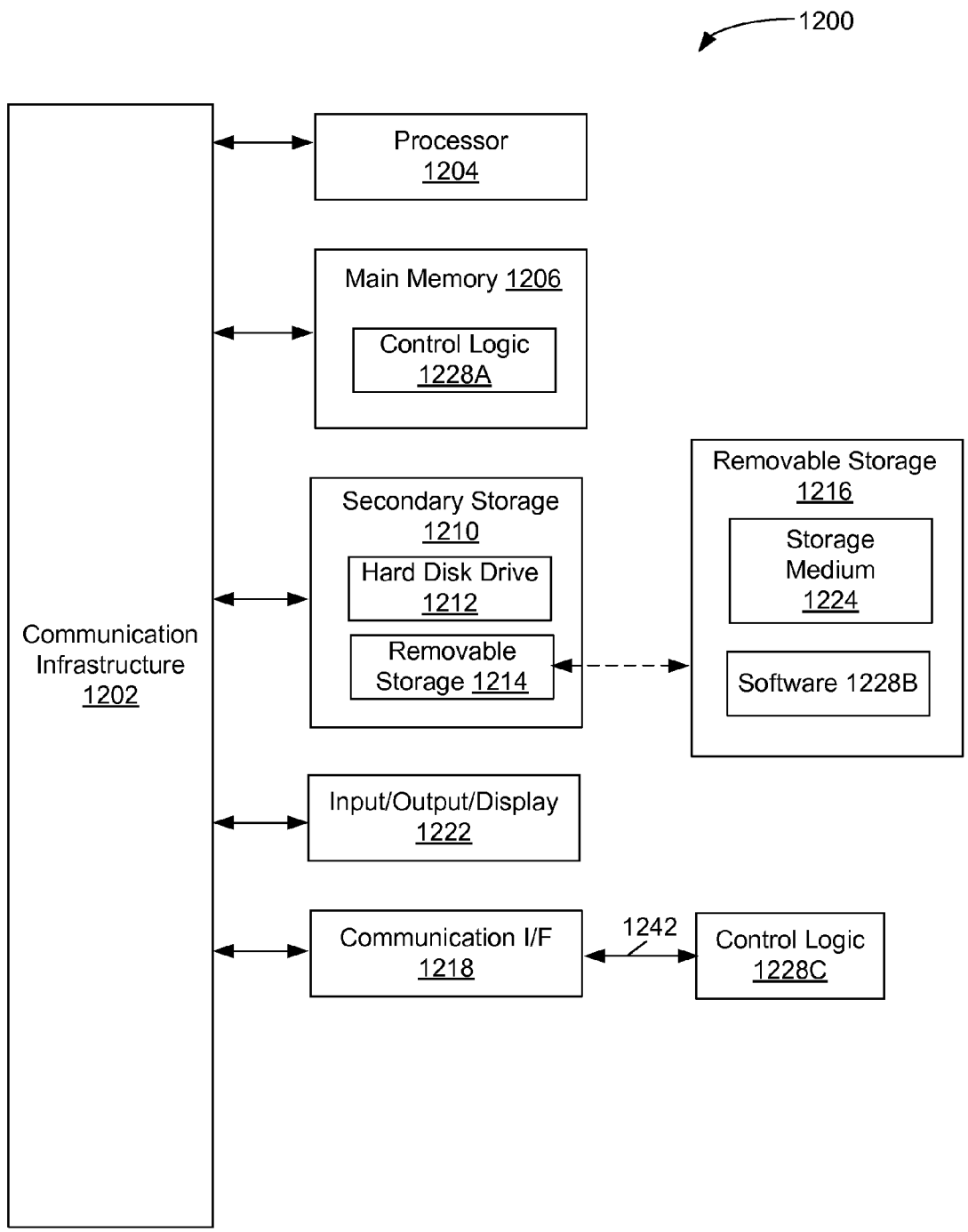
FIG. 12 is a block diagram of an exemplary computing device in which embodiments of the present disclosure may be implemented.

Embodiments of the loudspeaker localizer 505 may also delay processing using the arrangements of FIG. 5 and/or FIG. 6. Since spatial information is captured in the adaptive filters of the echo cancellation modules (EC3, EC4), the loudspeaker localizer 505 can select to wait for the receive processing to stop or slow down before performing source localization algorithms or processing, in accordance with embodiments of the present disclosure. Further, exemplary embodiments may forgo echo cancellation processing for a period of time (e.g., 5 ms) and utilize its resources towards source localization processing. Accordingly, for some embodiments, the spatial information may be safely maintained in the adaptive filters to avoid being lost during such periods of inactivity. For example, in some embodiments, the adaptive filters are implemented in memory 1206, 1212 (FIG. 12).

Figure 7:
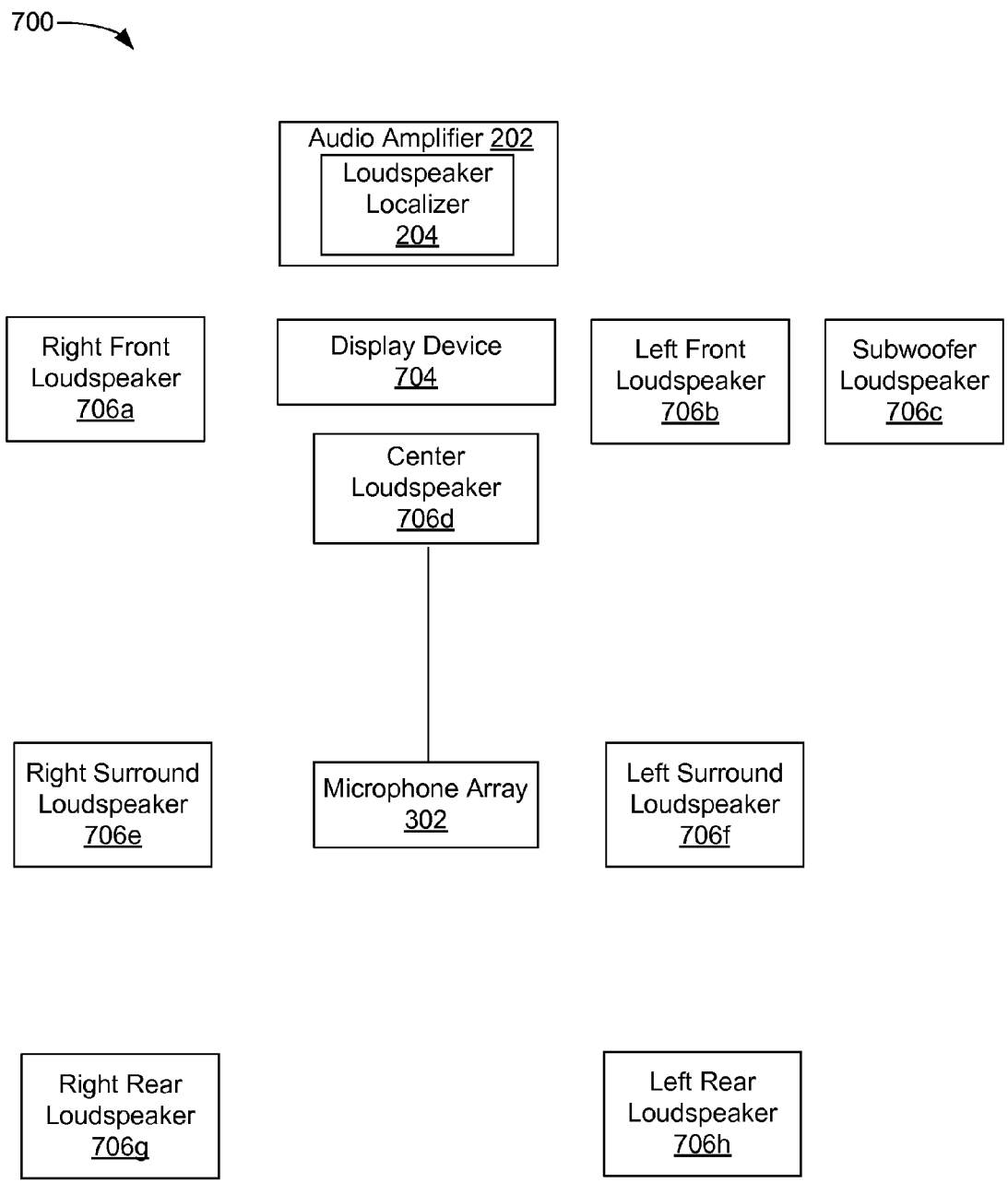
FIG. 7 is a block diagram of an exemplary sound system that implements loudspeaker localization according to embodiments of the present disclosure.

Referring back to FIG. 3, the loudspeaker localizer 204 and microphone array 302 may be implemented in any sound system having any number of loudspeakers, to determine and enable correction of the positions of the loudspeakers that are present. For instance, FIG. 7 shows a block diagram of a sound system 700, according to an example embodiment. Sound system 700 is an example 7.1 channel surround sound system that is configured for loudspeaker localization. As shown in FIG. 7, sound system 700 includes loudspeakers 706a-706h, a display device 704, audio amplifier 202, and microphone array 302. As shown in FIG. 7, audio amplifier 202 includes loudspeaker localizer 204. In FIG. 7, audio amplifier 202 generates two audio channels for left and right front loudspeakers 706a and 706b, one audio channel for a center loudspeaker 706d, two audio channels for left and right surround loudspeakers 706a and 706f, two audio channels for left and right surround loudspeakers 706g and 706h, and one audio channel for a subwoofer loudspeaker 706c. Loudspeaker localizer 204 may use microphone signals 304 that are representative of sound received from one or more of loudspeakers 706a-706h to determine the location of one or more of loudspeakers 706a-706h. Audio amplifier 202 may be configured to modify loudspeaker audio channels (not indicated in FIG. 7 for ease of illustration) that are generated to drive one or more of loudspeakers 706a-706h based on the determined location(s) to virtually reposition one or more of loudspeakers 706a-706h.

Note that the 7.1 channel surround sound system shown in FIG. 7 is provided for purposes of illustration, and is not intended to be limiting. In embodiments, loudspeaker localizer 204 may be included in further configurations of sound systems, including conference room sound systems, stadium sound systems, surround sound systems having different number of channels (e.g., 3.0 system, 4.0 systems, 5.1 systems, 6.1 systems, etc., where the number prior to the decimal point indicates the number of non-subwoofer loudspeakers present, and the number following the decimal point indicates whether a subwoofer loudspeaker is present), etc.

Loudspeaker localization may be performed in various ways, in embodiments. For example, in an embodiment, microphone array 302 of FIG. 3 may receive sound from a loudspeaker under test at a plurality of microphone locations. Microphone array 302 may include any number of one or more microphones. For example, a single microphone may be present that is moved from microphone location to microphone location (e.g., by a user) to receive sound at each of the plurality of microphone locations. In another example, microphone array 302 may include multiple microphones, with each microphone located at a corresponding microphone location, to receive sound at the corresponding microphone location (e.g., in parallel with the other microphones).

In an embodiment, the sound may be received from a single loudspeaker (e.g., sound 110a received from left loudspeaker 106a), or from multiple loudspeakers simultaneously, at a time selected to determine whether the loudspeaker(s) is/are positioned properly. The sound may be a test sound pulse or "ping" of a predetermined amplitude (e.g., volume) and/or frequency, or may be sound produced by a loudspeaker during normal use (e.g., voice, music, etc.). For instance, the position of the loudspeaker(s) may be determined at predetermined test time (e.g., at setup/initialization, and/or at a subsequent test time for the sound system), and/or may be determined at any time during normal use of the sound system.

Figure 8:
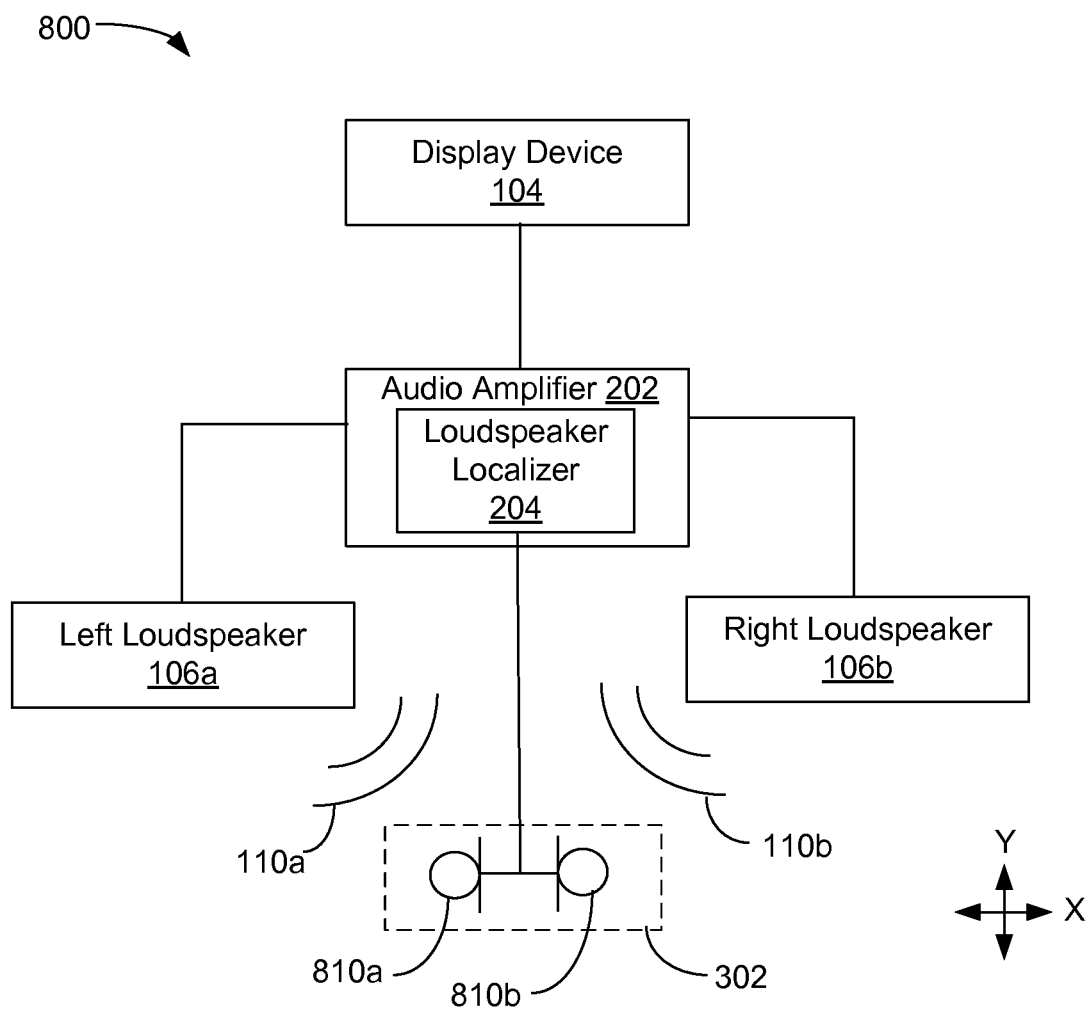
FIGS. 8-9 are block diagrams of exemplary sound systems that include example microphone arrays according to embodiments of the present disclosure.

Microphone array 302 may have various configurations. For instance, FIG. 8 shows a block diagram of sound system 300 of FIG. 3, according to an example embodiment. In FIG. 8, microphone array 302 includes a pair of microphones 810a and 810b. Microphone 810a is located at a first microphone location, and second microphone 810b is located at a second microphone location 810b. In one embodiment, microphones 810a and 810b may be fixed in location relative to each other (e.g., at a fixed separation distance) in microphone array 302 so that microphone array 302 may be moved while maintaining the relative positions of microphones 810a and 810b. In FIG. 8, microphones 810a and 810b are aligned along an x-axis (perpendicular to a y-axis) that is approximately parallel with an axis between right and left loudspeakers 106a and 106b. In the arrangement of FIG. 8, because two microphones 810a and 810b are present and aligned on the x-axis, loudspeaker localizer 204 may determine the locations of loudspeakers 106a and 106b anywhere in the x-y plane, without being able to determine which side of the x-axis that loudspeakers 106a and 106b reside. In other implementations, microphone array 310 of FIG. 8 may be positioned in other orientations, including being perpendicular (aligned with the y-axis) to the orientation shown in FIG. 8.

In an alternative embodiment, microphones 810a and 810b may not be separated by a predetermined distance in that the distance may be variable or configurable. Accordingly, depending on the source localization algorithm implemented, an exact distance between the microphones may not be known in some embodiments.

Figure 9:
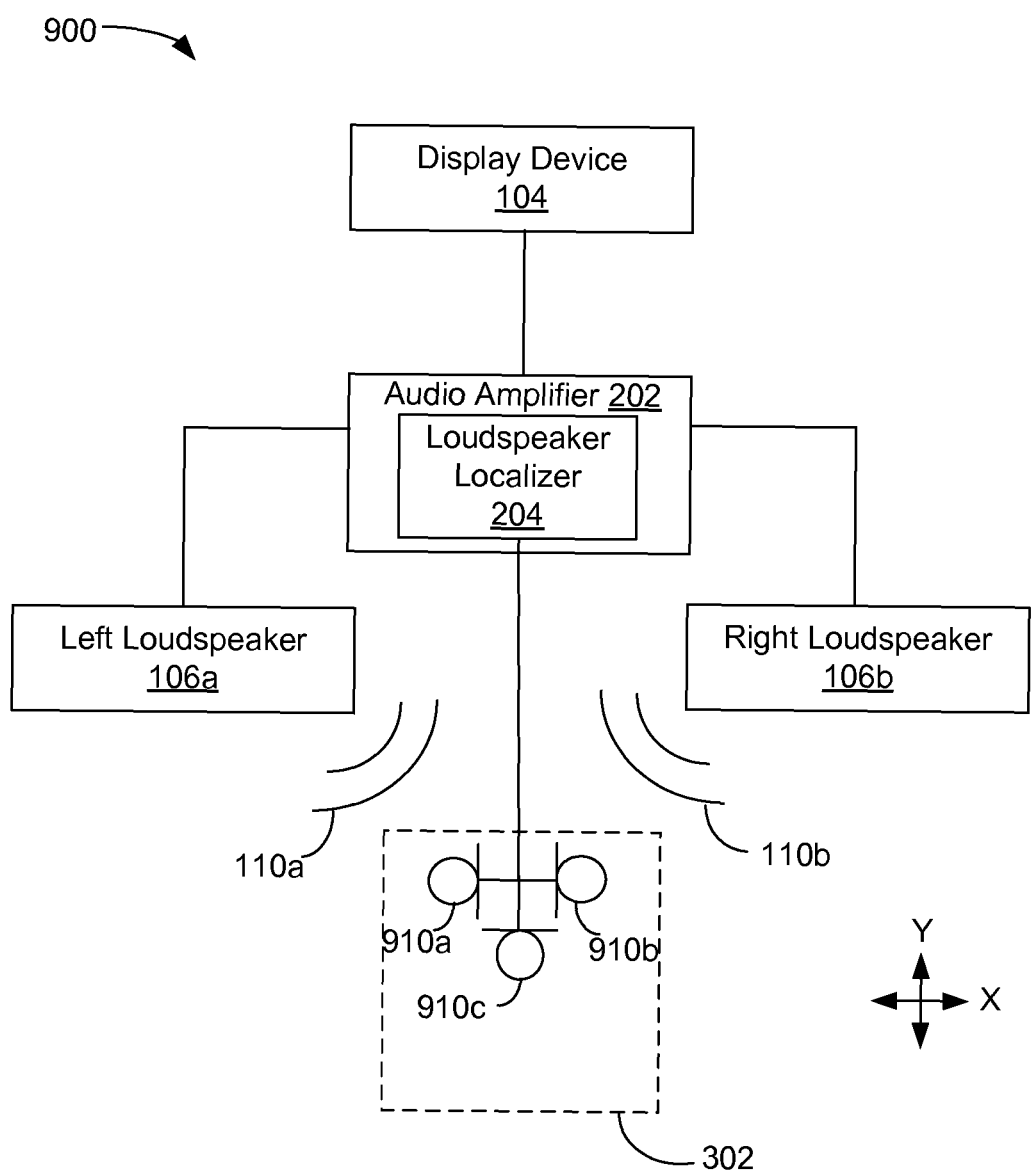

FIG. 9 shows a block diagram of sound system 300 of FIG. 3 that includes another example of microphone array 302, according to an embodiment. In FIG. 9, microphone array 302 includes three microphones 910a-910c. Microphone 910a is located at a first microphone location, second microphone 910b is located at a second microphone location, and third microphone 910c is located at a third microphone location, in a triangular configuration. In some embodiments, microphones 910a-910c may be fixed in location relative to each other (e.g., at fixed separation distances) in microphone array 302 so that microphone array 302 may be moved while maintaining the relative positions of microphones 910a-910c. Also, in some embodiments, the microphones may not be fixed and may be capable of being configured at variable distances.

In FIG. 9, microphones 910a and 910b are aligned along an x-axis (perpendicular to a y-axis) that is approximately parallel with an axis between right and left loudspeakers 106a and 106b, and microphone 910c is offset from the x-axis in the y-axis direction, to form a two-dimensional arrangement. Due to the two-dimensional arrangement of microphone array 302 in FIG. 9, loudspeaker localizer 204 may determine the locations of loudspeakers 106a and 106b anywhere in the 2-dimensional x-y plane, including being able to determine which side of the x-axis, along the y-axis, that loudspeakers 106a and 106b reside.

In other implementations, microphone array 310 of FIG. 9 may be positioned in other orientations, including perpendicular to the orientation shown in FIG. 8 (e.g., microphones 810a and 810b aligned along the y-axis). Note that in further embodiments, microphone array 310 may include further numbers of microphones 610, including four microphones, five microphones, etc. In one example embodiment, microphone array 310 of FIG. 9 may include a fourth microphone that is offset from microphones 910a-910c in a z-axis that is perpendicular to the x-y plane. In this manner, loudspeaker localizer 204 may determine the locations of loudspeakers 106a and 106b anywhere in the 3-dimensional x-y-z space.

Microphone array 310 may be implemented in a same device or separate device from loudspeaker localizer 204. For example, in an embodiment, microphone array 310 may be included in a standalone microphone structure or in another electronic device, such as in a video game console or video game console peripheral device (e.g., the Nintendo® Wii™ Sensor Bar), an IP phone, audio amplifier 202, etc. Also, multi-channel audio streaming/playback through an audio/video device connect to stereo loudspeakers and a microphone array may be tested so that audio spatialization matches video contents displayed on a screen. Therefore, a user may position microphone array 310 in a location suitable for testing loudspeaker locations, including a location predetermined for the particular sound system loudspeaker arrangement. Microphone array 310 may be placed in a location permanently or temporarily (e.g., just for test purposes).

Referring back to FIG. 4 and/or FIG. 5, in an embodiment, decision module 430, 530 may determine whether the location of a loudspeaker indicated by location information provided by echo cancellation module matches a predetermined desired loudspeaker location for the loudspeaker. The location information may include one or more location indications, including an angle or direction of arrival indication, a distance indication, etc.

For instance, as decision module 430, 530 may receive generated location information and predetermined location information. Decision module 430, 530 may be configured to compare generated location information and predetermined location information to determine whether they match, and may generate correction information based on the comparison. If generated location information and predetermined location information do not match (e.g., a difference is greater than a predetermined threshold value), the loudspeaker is determined to be incorrectly positioned, and correction information may indicate a corrective action to be performed.

Predetermined location information may be input by a user (e.g., at a user interface), may be provided electronically from an external source, and/or may be stored (e.g., in storage of loudspeaker localizer 204). Predetermined location information may include position information for each loudspeaker in one or more sound system loudspeaker arrangements. For instance, for a particular loudspeaker arrangement, predetermined location information may indicate a distance and a direction of arrival desired for each loudspeaker with respect to the position of microphone array or other reference location.

In one embodiment, receive processor 410, 510 of an audio amplifier 202 may be configured to enable a corrective action to be performed automatically (e.g., electronically) based on correction information to virtually reposition a loudspeaker. Receive processor 410, 510 may be configured to modify a volume, phase, frequency, and/or other audio characteristic of one or more loudspeakers in the sound system to virtually reposition a loudspeaker that is not positioned correctly. As an example, signals or feeds to left and right loudspeakers 106 may be inverted, in some embodiments.

Further, receive processor 410, 510 may be configured to use techniques of spatial audio rendering, such as wave field synthesis, to create a virtual loudspeaker at a desired loudspeaker position. According to wave field synthesis, any wave front can be regarded as a superposition of elementary spherical waves, and thus a wave front can be synthesized from such elementary waves. For instance, an exemplary receive processor 410, 510 may modify one or more audio characteristics (e.g., volume, phase, etc.) of first loudspeaker 106a and a second loudspeaker 106b positioned on the opposite side of a desired loudspeaker position from the first loudspeaker 106a to create a virtual loudspeaker at the desired loudspeaker position. Techniques for spatial audio rendering, including wave field synthesis, will be known to persons skilled in the relevant art(s).

In an embodiment, receive processor 410, 510 may be an audio processor (e.g., a digital signal processor (DSP)) that is dedicated to loudspeaker localizer 204. In another embodiment, such an audio processor may be integrated in a device (e.g., a stereo amplifier, an Internet Protocol (IP) phone, etc.) that is configured for processing audio, such as audio amplification, filtering, equalization, etc., including any such device mentioned elsewhere herein or otherwise known.

In another embodiment, a loudspeaker may be repositioned manually (e.g., by a user) based on correction information. For instance, a display device 102 may have a user interface configured to provide instructions to a user to perform the corrective action to reposition a loudspeaker that is not positioned correctly, in certain embodiments. Such a user interface may include a display device that displays the corrective action (e.g., textually and/or graphically) to the user. Examples of such corrective actions include instructing the user to physically reposition a loudspeaker, to modify a volume of a loudspeaker, to reconnect/reconfigure cable connections, etc. Instructions may be provided for any number of one or more loudspeakers in the sound system.

Embodiments of loudspeaker localization are applicable to these and other instances of the incorrect positioning of loudspeakers, including any number of loudspeakers in a sound system. Such techniques may be sequentially applied to each loudspeaker in a sound system, for example, to correct loudspeaker positioning problems. For instance, the reversing of left-right audio in a sound system is fairly common, particularly with advance sounds systems, such as 5.1 or 6.1 surround sound. Embodiments enable such left-right reversing to be corrected, manually or electronically. Sometimes, due to the layout of a room in which a sound system is implemented (e.g., a home theatre room, conference room, etc.), it may be difficult to properly position loudspeakers in their desired positions (e.g., due to obstacles). Embodiments enable mis-positioning of loudspeakers in such cases to be corrected, manually or electronically.

Figure 10:
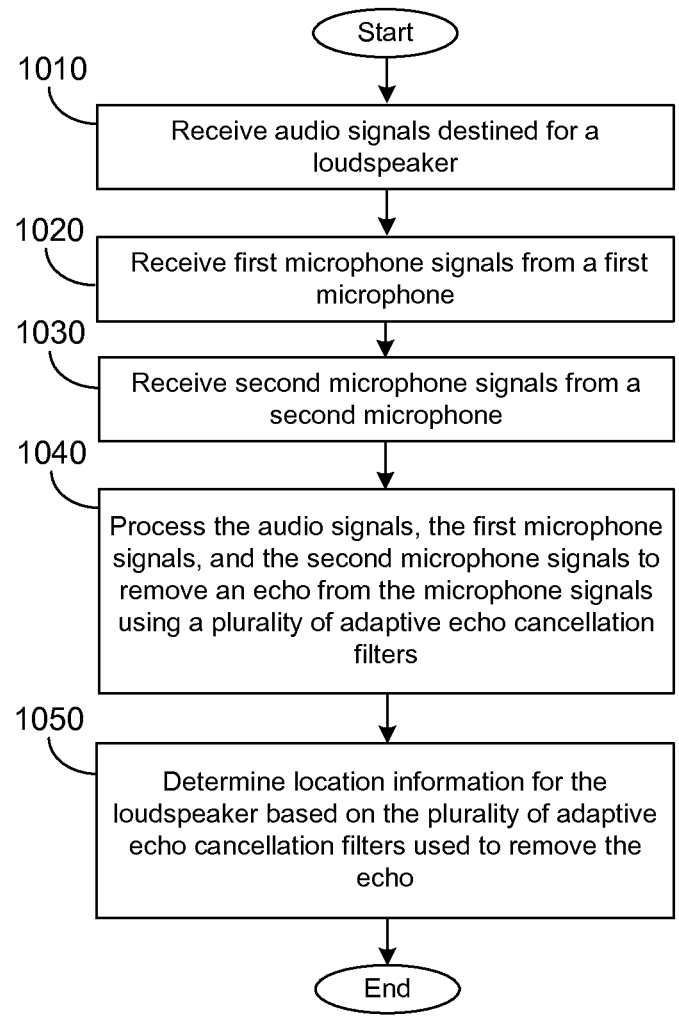
FIGS. 10-11 are flow chart diagrams for performing loudspeaker localization according to embodiments of the present disclosure.

Referring next to FIG. 10, shown is a flow chart that provides one example of the operation of a portion of the loudspeaker localizer 204 (FIG. 2) according to various embodiments. It is understood that the flow chart of FIG. 10 provides merely an example of the many different types of functional arrangements that may be employed to implement the operation of the portion of the loudspeaker localizer 204 and/or related components as described herein. As an alternative, the flow chart of FIG. 10 may be viewed as depicting an example of operations or actions of a method implemented in a computing device 1200 (FIG. 12) according to one or more embodiments.

Beginning with reference character 1010, audio signals destined for a loudspeaker (SPR) are received. In addition, first microphone signals from a first microphone (ML) are received (1020). Further, second microphone signals from a second microphone (MR) are also received (1030). Accordingly, the first and second microphones may be part of a microphone array 302 arranged to obtain signal information that is useful in localizing the loudspeaker (SPR). Therefore, the audio signals, the first microphone signals, and the second microphone signals are then processed (1040) to remove an echo from the microphone signals using a plurality of adaptive echo cancellation filters (F1, F2). The echo was produced from playing of the audio signals by the loudspeaker (SPR). Next, location information is determined (1050) for the loudspeaker (SPR) based on the plurality of adaptive echo cancellation filters (F1, F2) used to remove the echo.

Figure 11:
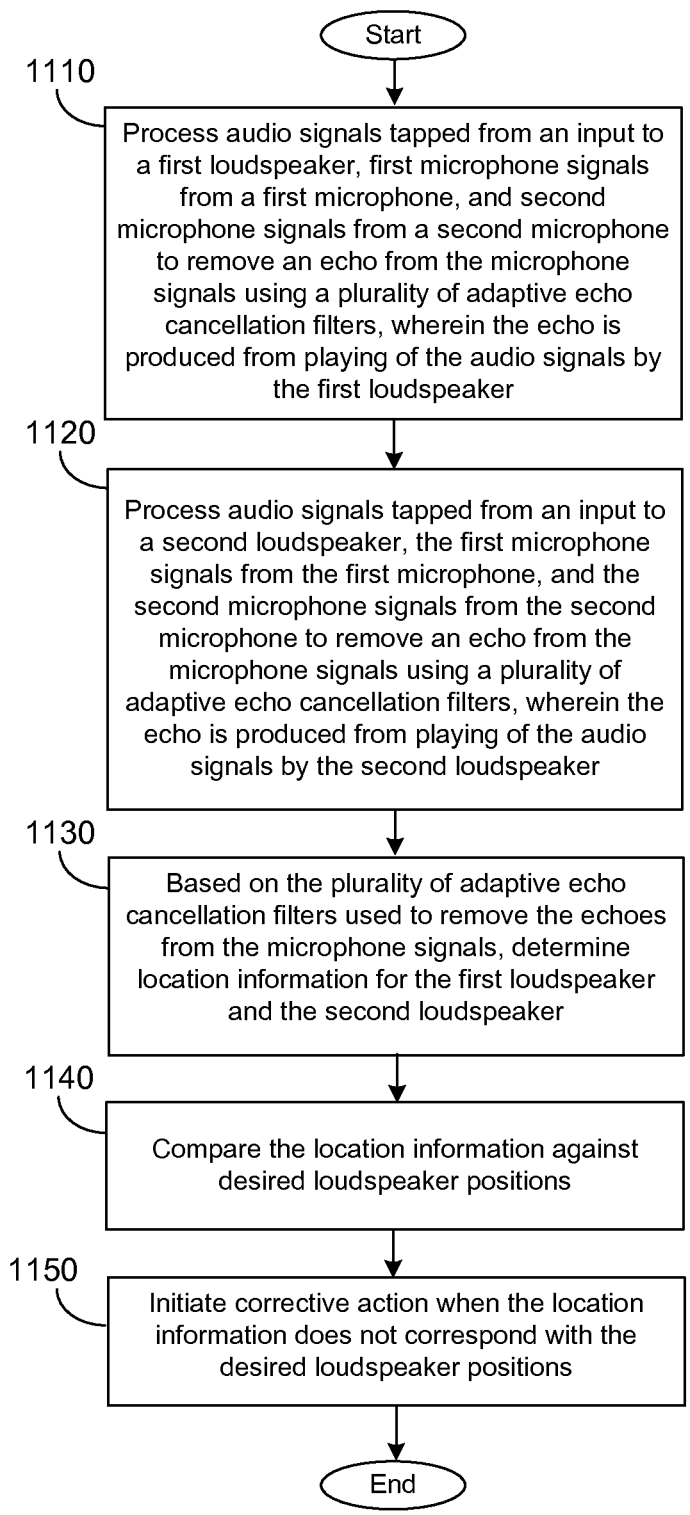

Next, FIG. 11 shows is a flow chart that provides one example of the operation of a portion of the loudspeaker localizer 204 (FIG. 2) according to various embodiments. It is understood that the flow chart of FIG. 11 provides merely an example of the many different types of functional arrangements that may be employed to implement the operation of the portion of the loudspeaker localizer 204 and/or related components as described herein. As an alternative, the flow chart of FIG. 11 may be viewed as depicting an example of operations or actions of a method implemented in a computing device 1200 (FIG. 12) according to one or more embodiments.

Beginning with reference character 1110, audio signals tapped from an input to a first loudspeaker (SPL), first microphone signals from a first microphone (ML), and second microphone signals from a second microphone (MR) are processed, by an echo cancellation module (EC3), to remove an echo from the microphone signals using a plurality of adaptive echo cancellation filters, wherein the echo is produced from playing of the audio signals by the first loudspeaker (SPL). Next, audio signals tapped from an input to a second loudspeaker (SPR), the first microphone signals from the first microphone (ML), and the second microphone signals from the second microphone (MR) are processed (1120), by an echo cancellation module (EC4), to remove an echo from the microphone signals using a plurality of adaptive echo cancellation filters, wherein the echo is produced from playing of the audio signals by the second loudspeaker (SPR). Then, based on the plurality of adaptive echo cancellation filters used to remove the echoes from the microphone signals, location information for the first loudspeaker (SPL) and the second loudspeaker (SPR) is determined (1130) by source localization modules (520L, 520R). Further, the location information is compared (1140) against desired loudspeaker positions and corrective action is initiated (1150), by the decision module 530, when the location information does not correspond to the desired loudspeaker positions.

Audio amplifier 202, loudspeaker localizer 204, decision module 430, 540, receive processor 410, 510, echo cancellation modules (EC1-EC4), 605, source localization modules 420, 520, and push logic (PL) may be implemented in hardware, software, firmware, or any combination thereof. For example, select components may be implemented as computer program code configured to be executed in one or more processors. Alternatively, select components may be implemented as hardware logic/electrical circuitry. If implemented in hardware, embodiments can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The embodiments described herein, including systems, methods/processes, and/or apparatuses, may be implemented using well known computing devices/processing devices. A computing device 1200 (FIG. 12) is described as follows as an example of a computing device, for purposes of illustration. Relevant portions or the entirety of computing device 1200 may be implemented in an audio device, a video game console (e.g., with voice over IP), an IP telephone, a set top box (e.g., with voice over IP), surround sound systems, tablets or cell phones (e.g., with music streaming capabilities) and/or other electronic devices in which embodiments of the present disclosure may be implemented.

Computing device 1200 includes one or more processors (also called central processing units, or CPUs), such as a processor 1204. Processor 1204 is connected to a communication infrastructure 1202, such as a communication bus. In some embodiments, processor 1204 can simultaneously operate multiple computing threads.

Computing device 1200 also includes a primary or main memory 1206, such as random access memory (RAM). Main memory 1206 has stored therein control logic 1228A (computer software), and data. Computing device 1200 also includes one or more secondary storage devices 1210. Secondary storage devices 1210 include, for example, a hard disk drive 1212 and/or a removable storage device or drive 1214, as well as other types of storage devices, such as memory cards and memory sticks. For instance, computing device 1200 may include an industry standard interface, such a universal serial bus (USB) interface for interfacing with devices such as a memory stick. Removable storage drive 1214 represents a floppy disk drive, a magnetic tape drive, a compact disk drive, an optical storage device, tape backup, etc.

Removable storage drive 1214 interacts with a removable storage unit 2016. Removable storage unit 1216 includes a computer useable or readable storage medium 1224 having stored therein computer software 2028B (control logic) and/or data. Removable storage unit 1216 represents a floppy disk, magnetic tape, compact disk, DVD, optical storage disk, or any other computer data storage device. Removable storage drive 1214 reads from and/or writes to removable storage unit 1216 in a well-known manner.

Computing device 1200 also includes input/output/display devices 1222, such as monitors, keyboards, pointing devices, etc. Computing device 1200 further includes a communication or network interface 1218. Communication interface 1218 enables the computing device 1200 to communicate with remote devices. For example, communication interface 1218 allows computing device 1200 to communicate over communication networks or mediums 1242 (representing a form of a computer useable or readable medium), such as LANs, WANs, the Internet, etc. Network interface 1218 may interface with remote sites or networks via wired or wireless connections. Control logic 1228C may be transmitted to and from computing device 1200 via the communication medium 1242.

Any apparatus or manufacture comprising a computer useable or readable medium having control logic (software) stored therein is referred to herein as a computer program product or program storage device. This includes, but is not limited to, computing device 1200, main memory 1206, secondary storage devices 1210, and removable storage unit 1216. Such computer program products, having control logic stored therein that, when executed by one or more data processing devices, cause such data processing devices to operate as described herein, represent embodiments of the present disclosure.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Such computer-readable media may store program modules that include computer program logic for audio amplifier 202, loudspeaker localizer 204, decision module 430, 540, receive processor 410, 510, echo cancellation modules (EC1-EC4), 605, source localization modules 420, 520, and push logic (PL), flowcharts (FIGS. 10-11) and/or further embodiments of the present disclosure described herein. Embodiments of the present disclosure are directed to computer program products comprising such logic (e.g., in the form of program code or software) stored on any computer useable medium. Such program code, when executed in one or more processors, causes a device to operate as described herein.

Embodiments of the present disclosure can work with software, hardware, and/or operating system implementations other than those described herein. Any software, hardware, and operating system implementations suitable for performing the functions described herein can be used. Any process descriptions or blocks in flow charts should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the present disclosure.

As an example, in some embodiments of the systems of FIG. 4 and/or FIG. 5, echo cancellers and a source localization algorithm implemented by source localization modules might operate on only a portion of the spectrum of the signals played by the loudspeakers. For instance, music might be processed by a receive processing block and then played out to the loudspeakers at 48 KHz or 44.1 KHz sampling rate, for a total spectrum of a few Hertz to 24 KHz or 22.05 KHz. In some embodiments, analyzing a sub-range of frequencies (e.g., between 300 Hz and 1 KHz) may be sufficient to perform source localization.

Additionally, in embodiments where echo cancellers are used for the benefit of source localization (e.g., as opposed to a two-way communication device where echo-free signal may be sent over a large spectrum), the loudspeaker signals and the microphone signals may be band-pass filtered and down-sampled as they come into the echo cancellers. One possible advantage of such an approach is computational complexity. In the case of a frequency sub-band of 300 Hz to 1 KHz for instance, one could achieve a down-sampling rate of up to 20 compared to a whole band of 50 Hz to 20+ KHz, which would yield huge savings in both computations and memory for both echo cancellation and source localization. Certain embodiments are also compatible with frequency-domain and sub-band-domain echo cancellation and source localization techniques. For example, audio signals may be sliced into frequency sub-bands and then both echo cancellation and source localization are performed in each sub-band.

All such modifications and variations are intended to be included herein within the scope of this disclosure and protected by the following claims.

Therefore, having thus described various embodiments, at least the following is claimed:

1. A system comprising:
    first echo cancellation circuitry configured to receive a first input of audio signals destined for a first loudspeaker; a second input of first microphone signals received from a first microphone; and a third input of second microphone signals received from a second microphone, wherein the first echo cancellation circuitry further comprises a first pair of adaptive filters;
    second echo cancellation circuitry configured to receive a fourth input of audio signals destined for a second loudspeaker positioned at a distance from the first loudspeaker; a fifth input of second microphone signals received from the first microphone; and a sixth input of second microphone signals received from the second microphone, wherein the second echo cancellation circuitry further comprises a second pair of adaptive filters;
    wherein each of the first echo cancellation circuitry and the second echo cancellation circuitry is configured to remove an echo from the first and second microphone signals, wherein the echo is produced from playing of the audio signals by one of the first and second loudspeakers;
    first source localization circuitry configured to receive a copy of a portion of the first pair of adaptive filters from the first echo cancellation circuitry that is used to remove the echo produced by the first loudspeaker and configured to determine a location of the first loudspeaker based on spatial information captured in the first pair of adaptive filters; and
    second source localization circuitry configured to receive a copy of a portion of the second pair of adaptive filters from the second echo cancellation circuitry that is used to remove the echo produced by the second loudspeaker and is configured to determine a location of the second loudspeaker based on spatial information captured in the second pair of adaptive filters.

2. The system of claim 1, further comprising decision circuitry
    configured to correct positioning of the first loudspeaker based on the location determined by the first source localization circuitry.

3. The system of claim 2, wherein feeds to the first loudspeaker and the second loudspeaker are swapped in order to correct the positioning.

4. The system of claim 1, the first echo cancellation circuitry comprising push logic circuitry that is configured to periodically update the first source localization circuitry with updated adaptive filters.

5. The system of claim 1, wherein the first source localization circuitry and the second source localization circuitry are configured to determine location information for the first and second loudspeakers when the first echo cancellation circuitry and the second echo cancellation circuitry are inactive.

6. The system of claim 1, wherein the portion of the first pair of adaptive filters comprises a subset of filter coefficients for each of the first pair of adaptive filters.

7. The system of claim 1, wherein the first echo cancellation circuitry and the second echo cancellation circuitry delay adaption of the pairs of adaptive filters to allow the first and second source localization circuitry to process input signals and determine location information for the first and second loudspeakers.

8. The system of claim 7, wherein states of the first and second pairs of adaptive filters are maintained during a delay of the processing.

9. The system of claim 1, wherein the first microphone and the second microphone are part of a microphone array, the microphone array further comprising a third microphone.

10. The system of claim 1, wherein the pair of adaptive filters comprise non-linear filters.

11. A method comprising:
    receiving audio signals destined for a loudspeaker;
    receiving first microphone signals from a first microphone;
    receiving second microphone signals from a second microphone;
    processing the audio signals, the first microphone signals, and the second microphone signals to remove an echo from the first and second microphone signals using a plurality of adaptive echo cancellation filters, wherein the echo is produced from playing of the audio signals by the loudspeaker;
    receiving a copy of at least a portion of the plurality of adaptive echo cancellation filters at a source localization circuitry; and
    determining location information for the loudspeaker using the source localization circuitry based on spatial information captured in the plurality of adaptive echo cancellation filters used to remove the echo.

12. The method of claim 11, further comprising periodically updating source localization circuitry with updated adaptive filters, wherein the source localization circuitry determines the location information for the loudspeaker.

13. The method of claim 11, wherein the location information is determined for the loudspeaker when adaptation of the adaptive echo cancellation filters is inactive.

14. The method of claim 11, wherein only a subset portion of filter coefficients is used to determine the location information for the loudspeaker.

15. The method of claim 11, further comprising delaying processing of the audio signals, the first microphone signals, and the second microphone signals to remove the echo while the location information is being determined for the loudspeaker.

16. A non-transitory computer readable medium having a program executable by a hardware processor to perform:
processing audio signals tapped from an input to a loudspeaker, first microphone signals from a first microphone, and second microphone signals from a second microphone to remove an echo from the first and second microphone signals using a plurality of adaptive echo cancellation filters, wherein the echo is produced from playing of the audio signals by the loudspeaker;
receiving a copy of at least a portion of the plurality of adaptive echo cancellation filters; and
determining location information for the loudspeaker using a source localization circuitry based on spatial information captured in the plurality of adaptive echo cancellation filters used to remove the echo.

17. The non-transitory computer readable medium of claim 16, further comprising generating commands to correct positioning of the loudspeaker based on the determined location.

18. The non-transitory computer readable medium of claim 16, wherein the commands cause a feed to the loudspeaker to be swapped with a feed to a second loudspeaker in order to correct the positioning.

19. The non-transitory computer readable medium of claim 16, wherein only a subset portion of filter coefficients is used to determine the location information for the loudspeaker.

20. The non-transitory computer readable medium of claim 16, wherein the location information is determined for the loudspeaker when adaptation of the adaptive echo cancellation filters is inactive.

* * * * *